United States Patent [19]

Grundmann

[11] Patent Number: 4,469,818

[45] Date of Patent: Sep. 4, 1984

[54] PROCESS FOR THE PRODUCTION OF A VOLUMINOUS, PARTICULATE VINYL CHLORIDE POLYMER

[75] Inventor: Raban Grundmann, Marl, Fed. Rep. of Germany

[73] Assignee: Chemische Werke Huels AG, Marl, Fed. Rep. of Germany

[21] Appl. No.: 415,509

[22] Filed: Sep. 7, 1982

[30] Foreign Application Priority Data

Sep. 5, 1981 [DE] Fed. Rep. of Germany ....... 3135198

[51] Int. Cl.$^3$ .......................... C08F 47/08; C08J 1/26
[52] U.S. Cl. .......................................... 521/64; 521/87
[58] Field of Search .................................... 521/64, 87

[56] References Cited

U.S. PATENT DOCUMENTS 3,450,650 6/1969 Murata ................................... 521/87
4,166,171 8/1979 Mitchell .............................. 528/448

FOREIGN PATENT DOCUMENTS 11416 5/1980 Fed. Rep. of Germany .

OTHER PUBLICATIONS

"Ullmanns Encyklopadie der Technischen Chemie" [Ullmann's Encyclopedia of Technical Chemistry] 3rd edition, vol. 7, p. 296.

*Primary Examiner*—John Kight
*Assistant Examiner*—M. L. Moore
*Attorney, Agent, or Firm*—Millen & White

[57] ABSTRACT

The invention concerns the production of a voluminous, particulate vinyl chloride polymer by precipitation of a solution of the polymer in a heated, agitated nonsolvent with removal of the solvent by distillation, the nonsolvent exhibiting a boiling point of $>100°$ C. under normal pressure, and the temperature of the nonsolvent being 40°–120° C. above the boiling point of the solvent, but does not fall below 100° C. nor range above 180° C. The voluminous, particulate polymer is suitable for the production of damping materials.

11 Claims, No Drawings

PROCESS FOR THE PRODUCTION OF A VOLUMINOUS, PARTICULATE VINYL CHLORIDE POLYMER

BACKGROUND OF THE INVENTION

The present invention concerns a process for the production of a voluminous, particulate polyvinyl chloride usable as a damping material.

It is conventional to precipitate polymers from a solution thereof, by mixing the polymer solution with a liquid which is a non-solvent with respect to the polymer. In such processes, depending on the respective arrangement, powders or fibers are obtained (see, for example, "Ullmanns Encyklopädie der technischen Chemie" [Ullmann's Encyclopedia of Technical Chemistry] 3rd edition, vol. 7, page 296).

It is also known to introduce a polymer solution in metered amounts into hot, but not boiling water, during which step the solvent is removed by evaporation and the polymer is obtained in an aqueous suspension (European Patent Application No. 11,416, Stauffer Chem. Comp.). Finally, a process is also known wherein the polymer solution is dripped onto a moving film of a nonsolvent, and the solvent is evaporated at temperatures of, preferably, 70°–85° C. (U.S. Pat. No. 4,166,171, Goodyear Tire and Rubber Comp.). This process preferably involves the processing of polyvinyl chloride solutions in tetrahydrofuran by adding these solutions to an aqueous salt or glycerol solution.

However, the aforementioned methods all exhibit significant disadvantages. At the aforementioned temperatures of about 70°–95° C. for the nonsolvent, the evaporation of the polymer solution takes place relatively slowly, so that a tacky intermediate stage occurs. This leads to caking of the precipitated polymer material and to deposits on the agitator. In addition, the increase in volume of the thus-precipitated polyvinyl chloride is relatively low.

SUMMARY OF THE INVENTION

Accordingly, it is an object of this invention to produce a voluminous, loose, nonsticky precipitation polyvinyl chloride product having a low bulk density and being usable as a thermal insulating material.

It is another object of this invention to produce such a material which is fire-retardant.

Upon further study of the specification and appended claims, further objects and advantages of this invention will become apparent to those skilled in the art.

These objects have been attained by providing a process for preparing a voluminous, particulate vinyl chloride polymer comprising adding a solution of the polymer in a solvent to a heated, agitated nonsolvent for the polymer with removal of the solvent by distillation, thereby precipitating the vinyl chloride polymer, wherein the nonsolvent has a boiling point under normal pressure of >100° C. and the temperature of the nonsolvent is 40°–120° C. above the boiling point of the solvent and is equal to or greater than 100° C. and equal to or less than 180° C.

DETAILED DISCUSSION

A priori, it could only be expected that using this invention, a relatively compact material would evolve, due to product shrinkage due to the high temperatures employed, as known, for example, from fibers. Surprisingly, this effect is overcompensated by the rapid evaporation of the solvent, resulting in a surprisingly voluminous, nonsticky, particulate product.

In detail, the process of this invention can be broken down into the following steps: preparation of the PVC solution; precipitation in hot nonsolvent; separation and drying of the product.

The starting materials can be conventional homo- or copolymers of vinyl chloride. Comonomers, e.g. vinyl acetates, acrylates, vinyl ethers, acrylonitrile, maleic acid, fumaric acid esters, vinylidene chloride, propylene, ethylene etc. can be contained in the polyvinyl chloride copolymer in amounts of up to 20 molar percent. In addition, conventional post-chlorinated PVC types with chlorine contents of up to 65% are especially suitable for the process.

Such homo- and copolymers of vinyl chloride can be prepared by means of all known methods, e.g. by bulk polymerization, emulsion polymerization, suspension or microsuspension polymerization, and solution polymerization, e.g., as described in the monograph "Polyvinylchlorid and Vinylchlorid-Mischpolymerisate" [Polyvinyl Chloride and Vinyl Chloride Copolymers] by H. Kainer, Springer Publishers, Berlin/Heidelberg/New York (1965), e.g., disclosing bulk polymerization on pages 7–10, emulsion polymerization on pages 34–59, suspension polymerization on pages 12–34, and solution polymerization on pages 10–11 and whose entire disclosures are incorporated by reference herein. The preparation of post-chlorinated PVC types is disclosed in Ullmann's Encyklopädie der technischen Chemie 4. ed., vol. 15, pages 335–356.

The polymers are dissolved in suitable solvents which should have a boiling point below 160° C., preferably below 100° C., under normal pressure.

Examples of suitable solvents include ethers, such as tetrahydrofuran, dibutyl ether, dioxane, etc.; esters, such as ethyl acetate, ethyl propionate, ethylene carbonate, etc.; ketones, such as acetone, cyclohexanone, methyl ethyl ketone, methyl isobutyl ketone, 2-pentanone, 3-pentanone, cyclopentanone, etc.; chlorinated hydrocarbons, such as methylene chloride, tetrachloroethane, carbon tetrachloride, dichloroethane, 1,1,1-trichloroethane, etc.; aromatics, such as benzene, toluene, etc.; or polar liquids, such as carbon disulfide, etc. These can be used in the pure form or as mixtures. The solvents conventionally used in PVC fiber manufacture are preferred, for example tetrahydrofuran (THF), cyclohexanone, or mixtures, e.g. THF/butyl acetate, THF/methylene chloride, $CS_2$/acetone, $CS_2$/methylene chloride, acetone/benzene, etc.

The solutions should have PVC concentrations of 1–25% by weight, preferably of 5- to 15% by weight, preferably in tetrahydrofuran.

Suitable nonsolvents include liquids which neither dissolve nor swell polyvinyl chloride and which have a boiling point of >100° C., preferably >120 C. under normal pressure. Good results are achieved, e.g., with glycols, such as ethylene glycol, propylene glycol, etc.; polyglycols, such as diethylene glycol, triethylene glycol, etc.; polyhydric alcohols, such as glycerol, etc.; alcohols, such as n-hexanol, etc.; and carboxylic acids, such as acetic acid, propionic acid, etc.

It is also possible to achieve good results using aqueous solutions of inorganic salts, such as, for example, NaCl, $CaCl_2$, $KNO_3$, $MgSO_4$, Na acetate, etc. or aqueous solutions of organic additives, such as, for example, of mixtures of glycol/water, glycerol/water, etc. The concentrations of the salt solutions or the organic additive solutions are not especially critical and are usually in the range of 10-90 wt %.

The nonsolvent is usually maintained at a temperature of 100°-180° C. during the process of this invention. Preferably the temperature is 120°-160° C., preferably glycol being used. A characteristic feature of the process of this invention is that the temperature of the nonsolvent, independently of the pressure selected, is 40°-120° C., preferably, 60°-100° C. above the boiling point of the solvent but neither falls below 100° C. nor exceeds 180° C.

The precipitation of PVC can be conducted in a great variety of apparatuses and in a great variety of ways; in general, all per se conventional techniques can be used. The voluminous material is obtained most simply by dripping the PVC solution into an agitated, heated batch on nonsolvent, and removing the solvent by distillation and condensation. Especially favorable results regarding weight per unit volume are achieved by spraying the PVC solution through a single- or two-fluid nozzle under pressure or with propellant gas or propellant steam into the nonsolvent. Thus, the polymer solution is advantageously added in droplet form, as thin jet, or as a mist.

The bulk density of the precipitated product is affected by the temperature of the nonsolvent, the concentration of the PVC solution, and the type of metering device and mixing device. Although no strict rules can be formally enunciated for attaining maximum volume per unit weight, in general an axiom applies that lowering the concentration of the PVC solution and feeding in a finely distributed form, produce low bulk densities. Moreover, an optimum temperature of the nonsolvent in the mentioned temperature range, dependent on empirical parameters, can be determined; this optimum is generally in the range of 120°-160° C.

That is, using these general guidelines the process parameters can be readily optimized to achieve a product having a desired range of properties, perhaps with a few routine preliminary experiments. Similarly, other conventional process parameters such as rates of addition, manner of addition, selection of apparatuses, etc., can all be selected from among conventional alternatives using fully conventional considerations and, perhaps, a few routine preliminary experiments. In general, all details of all aspects of the process of this invention and the materials used therein are fully conventional unless indicated otherwise herein, and are disclosed, e.g., in U.S. Pat. No. 4,166,171 whose disclosures are incorporated by reference herein.

The nonsolvent can be kept in agitation by a customary stirrer or by being utilized in the form of a running liquid film. The process can be conducted batchwise or continuously. The use of pressure or vacuum during precipitation is feasible, but operation under normal pressure is preferred. In general, 10-200 g of solution of PVC are added to 100 g of nonsolvent. However, when working in a continuous manner, the amount of the solution of PVC can be considerably higher. After working-up, the solvent and the nonsolvent can be re-used without any disadvantage.

The thus-precipitated, voluminous polyvinyl chloride is conventionally separated by filters, screening devices, or by centrifuging. Residues of nonsolvent can be removed by washing with water. Drying is performed by blowing with air, vacuum-drying, heating to 120° C., or by a combination of the aforementioned possibilities.

The conventional addition of the usual amounts of thermal or light stabilizers prior to or after precipitation is advantageous in many instances. Examples include organotin compounds, epoxy compounds, benzotriazoles, triazine derivatives, salicylic acid derivatives, sterically hindered amines, etc.

The precipitation product is obtained in the form of flakes or fibers and has bulk densities of 10-200 g/l, preferably 20-80 g/l. By grinding in a mill, the product can be comminuted into particles of any desired fineness, but, of course, this entails an increase in bulk density.

Bulk densities can be determined conventionally; herein, they were determined by introducing the precipitation product into a 1-liter upright cylinder (height 30 cm) without vibrating or compacting it, and subsequently weighing it.

The weight of the precipitated PVC particles is, of course, conventionally a function of the concentration of the solution and the metering device. The individual particles weigh less than 1 g, preferably less than 0.1 g. The weight of the majority of the particles is from 100 to 0.01 mg, preferably 10-0.1 mg. In the case of ground products, the maximum particle weight is below 10 mg, preferably below 1 mg. The majority of the particles weigh from 1 to 0.0001 mg, preferably 0.1-0.001 mg.

Loose piles of the material usually exhibit a thermal conductivity R of 0.035-0.045 (W/mK). The voluminous material has self-extinguishing properties, like PVC processed without plasticizer.

The resultant materials can be used for the manufacture of fire-retardant thermal insulating materials, as well as for sound insulation, padding, or packaging of fragile goods. They can be present in the form of loose particles or in a bonded form as foam material. It is, of course, also possible to combine these materials with other damping materials and fillers, and to manufacture multi-layer composite materials therefrom. The overall process can be used, in particular, for processing of PVC wastes.

See, e.g., commonly assigned, commonly invented U.S. application Ser. No. 415,625, filed on even date, whose disclosure is entirely incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

(A) Production of Polyvinyl Chloride:

In a pressurized autoclave, 2,700 parts of vinyl chloride is polymerized in the presence of 4,650 parts of water, 0.2 part of a cellulose ether, 0.11 part of a partial ester of a polyol, and 0.2 part of dilauroyl peroxide, at 55° C. and under a pressure of 8 atm. gauge under agitation for 8 hours. The autoclave is expanded to normal pressure and evacuated for 30 minutes to 150 torr; K-value: 70.

(B) In a 4-liter stirrer-equipped apparatus with dropping funnel and distillation bridge, 2 liters of ethylene glycol is heated to 150° C. At this temperature, a solution of 50 g of polyvinyl chloride in 950 g of tetrahydrofuran (=5% strength solution) is added dropwise thereto under agitation during the course of 2 hours. While tetrahydrofuran is distilled off and condensed, the polyvinyl chloride is separated in flaky form. It is filtered, washed with water and methanol, and dried in a vacuum drying cabinet at temperatures of up to 100° C. The ethylene glycol and tetrahydrofuran can be reused for additional experiments. Yield: 49 g of polyvinyl chloride; bulk density: 40 g/l. The largest PVC particles weigh 0.1–0.2 g. 50 average particles weighed 300 mg, meaning an average particle weight of 6 mg.

COMPARATIVE TEST

With the same mode of operation, but with an ethylene glycol temperature of 95°–100° C., only a very small amount of tetrahydrofuran passes over as the distillate; the polyvinyl chloride product is sticky and curls around the agitator.

EXAMPLE 2a

A 6-liter agitator-equipped flask with dropping funnel and distillation attachment is charged with 3 liters of glycol and 1 liter of water at 120° C. A solution of 50 g of PVC in 950 g of tetrahydrofuran is added dropwise under agitation. While the evaporated THF is collected in the distillation receiver, the PVC is separated in the form of fine flakes. After separation by way of a vacuum filter, washing with water, and drying in a hot-air furnace at 100° C., a voluminous, white material is obtained having a bulk density of 18 g/l.

By grinding in a disk attrition mill (firm: Alpine, model 160 Z), the bulk density is raised to 22 g/l. The weight of 100 particles is 0.2 mg, i.e. the particles weigh 0.002 mg on the average.

EXAMPLE 2b

Corresponding to Example 1, a solution of 50 g of polyvinyl chloride in 720 g of tetrahydrofuran and 230 g of methylene chloride is precipitated in 2 liters of ethylene glycol at 140° C. The product is worked up analogously to Example 1. Bulk density: 31 g/l.

EXAMPLE 3

One kilogram of a 15% solution of polyvinyl chloride in tetrahydrofuran is sprayed, with the aid of a reciprocating pump, via metal conduits at a pressure of 5 bar through a 0.02 mm nozzle into a batch consisting of 2 liters of ethylene glycol (temperature: 160° C.). The glycol is contained in a 4-liter agitated flask with attached distillation bridge and distillation receiver to collect the tetrahydrofuran removed by distillation. After the glycol has cooled down, the voluminous precipitated product is filtered off through a fine mesh screen and washed with water. After drying, 146 g of precipitated polyvinyl chloride is obtained having a bulk density of 36 g/l.

EXAMPLE 4

One liter of a 5% solution of polyvinyl chloride in tetrahydrofuran is metered corresponding to Example 3 under a pressure of 3 bar into an agitated batch of glycol having a temperature of 135° C., in the form of a fine jet through a 0.1 mm nozzle. The product is worked up as described in the preceding examples. A fine-fibrous material is obtained having a bulk density of 22 g/l.

EXAMPLE 5

A 10% solution of post-chlorinated polyvinyl chloride (chlorine content: 65%) in tetrahydrofuran is dripped into ethylene glycol in an apparatus corresponding to Example 1, at 120° C., 140° C., and 160° C. After separation, washing, and drying, the following bulk densities are obtained:

| Temperature of Glycol: | 120° C. | Bulk Density: | 87 g/l |
| --- | --- | --- | --- |
| | 140° C. | | 83 g/l |
| | 160° C. | | 120 g/l |

EXAMPLE 6

1,000 g of a 5% tetrahydrofuran solution of a copolymer of vinyl chloride/vinyl acetate (95/5) is precipitated in glycol at 130° C. in accordance with Example 1. After separation, washing, drying, 48.5 g of a flaky, elastic material is obtained. Bulk density: 29 g/l.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing a voluminous, particulate vinyl chloride polymer comprising adding a solution of the polymer in a solvent to a heated, agitated nonsolvent for the polymer with removal of the solvent by distillation, thereby precipitating the vinyl chloride polymer, wherein the nonsolvent has a boiling point under normal pressure of >100° C. and the temperature of the nonsolvent is 40°–120° C. above the pressure dependent boiling point of the solvent and without any reference to the pressure is equal to or greater than 100° C. and equal to or less than 180° C.

2. a process of claim 1 wherein the temperature of the nonsolvent is 60°–100° C. above the boiling point of the solvent.

3. A process of claim 1 wherein the temperature of the nonsolvent is 120°–160° C.

4. A process of claim 1 wherein the solvent is tetrahydrofuran, dibutyl ether, dioxane, ethyl acetate, ethyl propionate, ethylene carbonate, acetone, cyclohexanone, methyl ethyl ketone, methyl isobutyl ketone, 2-pentanone, 3-pentanone, cyclopentanone, methylene chloride, tetrachloroethane, carbon tetrachloride, dichloroethane, 1,1,1-trichloroethane, benzene, toluene or carbon disulfide or mixtures thereof.

5. A process of claim 1 wherein the nonsolvent is ethylene glycol, propylene glycol, diethylene glycol, triethylene glycol, glycerol, n-hexanol, acetic acid or propionic acid or an aqueous solution of NaCl, $CaCl_2$, $KNO_3$, $MgSO_4$ or Na acetate or an aqueous solution of ethylene glycol and glycerol.

6. A process of claim 1 wherein the solvent has a boiling point below 160° C.

7. A process of claim 1 wherein the concentration of polyvinyl chloride in the solution is 1–25% wt %.

8. A process of claim 1, comprising precipitating polyvinyl chloride by adding a solution of polyvinyl chloride in tetrahydrofuran to ethylene glycol at 120°–160° C.

9. A process of claim 1 wherein the precipitation of the polymer solution is effected by spraying or spinning the polymer solution through nozzles into the nonsolvent.

10. Voluminous, polyvinyl chloride particles produced by the process of claim 1 and having a particle weight less than 1 g and a bulk density of 10–200 g/l.

11. PVC particles of claim 10 having a particle weight less than 0.1 g and a bulk density of 20–80 g/l.

* * * * *